(12) United States Patent
Day et al.

(10) Patent No.: US 7,191,174 B2
(45) Date of Patent: Mar. 13, 2007

(54) METHOD, QUERY OPTIMIZER, AND COMPUTER PROGRAM PRODUCT FOR IMPLEMENTING LIVE SWITCHOVER TO TEMPORARY SPARSE INDEX FOR FASTER QUERY PERFORMANCE

(75) Inventors: Paul Reuben Day, Rochester, MN (US); Brian Robert Muras, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 500 days.

(21) Appl. No.: 10/443,921

(22) Filed: May 22, 2003

(65) Prior Publication Data
US 2004/0236727 A1    Nov. 25, 2004

(51) Int. Cl.
G06F 7/00       (2006.01)
G06F 17/30      (2006.01)
(52) U.S. Cl. .................................. 707/5; 707/2; 707/3
(58) Field of Classification Search .................... 707/2, 707/3, 101, 1, 4, 5, 102
See application file for complete search history.

(56) References Cited

U.S. PATENT DOCUMENTS 6,643,636 B1 *  11/2003  Au et al. ...................... 707/2

OTHER PUBLICATIONS

Kabra et al., "Efficient mid-query re-optimization of sub-optimal query execution plans", International Conference on Management of Data Proceedings of the 1998 ACM SIGMOD international conference on Management of data, Seattle, Washington, 1998.*
Antoshenkov, "Dynamic Optimization of Index Scans Restricted by Booleans", ICDE, Proceedings of the Twelfth International Conference on Data Engineering, 1996.*

* cited by examiner

*Primary Examiner*—Apu M. Mofiz
*Assistant Examiner*—Michael J. Hicks
(74) *Attorney, Agent, or Firm*—Joan Pennington

(57) ABSTRACT

A method, a query optimizer, and computer program product are provided for implementing live switchover to a temporary sparse index for faster query performance. A first plan using an existing index is used for processing a query. A temporary sparse index is built for the query simultaneously with the first plan processing the query. When the temporary sparse index is built, processing the query with the first plan is stopped and a live switchover to the temporary sparse index is provided. Then a second plan using the temporary sparse index is used to continue processing the query at a point where processing stopped with the first plan.

16 Claims, 6 Drawing Sheets

METHOD, QUERY OPTIMIZER, AND COMPUTER PROGRAM PRODUCT FOR IMPLEMENTING LIVE SWITCHOVER TO TEMPORARY SPARSE INDEX FOR FASTER QUERY PERFORMANCE

FIELD OF THE INVENTION

The present invention relates generally to the database management field, and more particularly, relates to a method, query optimizer, and computer program product for processing and optimizing database queries in a database management system.

DESCRIPTION OF THE RELATED ART

A database management system typically includes a query optimizer that attempts to optimize the performance of a query. The query optimizer selects from multiple query plans or possible implementations of a query to execute the query with the greatest efficiency.

A current dilemma a database query optimizer is faced with regarding query performance is whether to use an existing index, or to create a temporary sparse index where the selection of the query is built into the temporary sparse index. This dilemma exists for queries that have ordering or grouping criteria from one table. This dilemma exists with every secondary file in a nested loop join implementation. There are very few queries that are not presented with this dilemma.

The trade off between the choices of using an existing index or temporary index may be understood as follows. The existing index has no start up time to use it, but using the existing index may result in long fetch times because extra I/Os on a table object typically must be performed to determine which records to discard and which to return to the user. Conversely, the temporary index has a start up cost to build, but once built, the fetch time will be faster. The fetch time is faster for a sparse index because every record processed in the temporary index is one of interest, and thus no time is wasted going to the table object for records that will be discarded immediately.

As a simple example consider the following query:

Select * from X inner join Y on (X.COL1=Y.COL1)
where (Y.COL2>current date−30 days).

For this example, assume we are doing a nested loop join in the order of X→Y, and assume the user has an existing index built over column COL1 in Y called Y_IX. The dilemma for this query is:

Use the existing index Y_IX (to probe Y from X) which has zero startup cost, but fetches will be slower since for every probe to Y_IX which matches (X.COL1=Y.COL1), we must go then to the table Y and apply the Y.COL2 selection criteria. For very large files, we can quickly begin to thrash on Y because we must check many values of Y.COL2 only to discard many records because they do not satisfy the query selection criteria.

Alternatively, create a temporary sparse index, which has a start up cost because we must scan Y and build the temporary index (call it: Y_TMP). However as the temporary index Y_TMP is built, the selection criteria (Y.COL2>current date−30 days) is applied, and thus, Y_TMP will only have a subset of the records in Y. As a result, once we start to fetch records, every probe to Y_TMP from X matches the selection criteria, and we do not do any unnecessary table lookups in Y. The fetch time will be much faster for the temporary index.

While the query optimizer costs this trade-off between using the existing index or creating the temporary index, the decision cannot always be accurate or provide the greatest efficiency. Further, the correct decision at one time may not be the correct decision at another time based on current system environment conditions such as system workload, whether the files or indexes happen to be in memory or not, the physical layout of objects on DASD, memory pool sizes, and the like.

A need exists for an improved mechanism for processing and optimizing database queries in a database management system.

SUMMARY OF THE INVENTION

A principal object of the present invention is to provide a method, a query optimizer, and computer program product for implementing live switchover to a temporary sparse index for faster query performance. Other important objects of the present invention are to provide such method and computer program product for implementing live switchover to a temporary sparse index for faster query performance substantially without negative effect and that overcome some of the disadvantages of prior art arrangements.

In brief, a method, a query optimizer, and computer program product are provided for implementing live switchover to a temporary sparse index for faster query performance. A first plan using an existing index is used for processing a query. A temporary sparse index is built for the query simultaneously with the first plan processing the query. When the temporary sparse index is built, processing the query with the first plan is stopped and a live switchover to the temporary sparse index is provided. Then a second plan using the temporary sparse index is used to continue processing the query at a point where processing stopped with the first plan.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
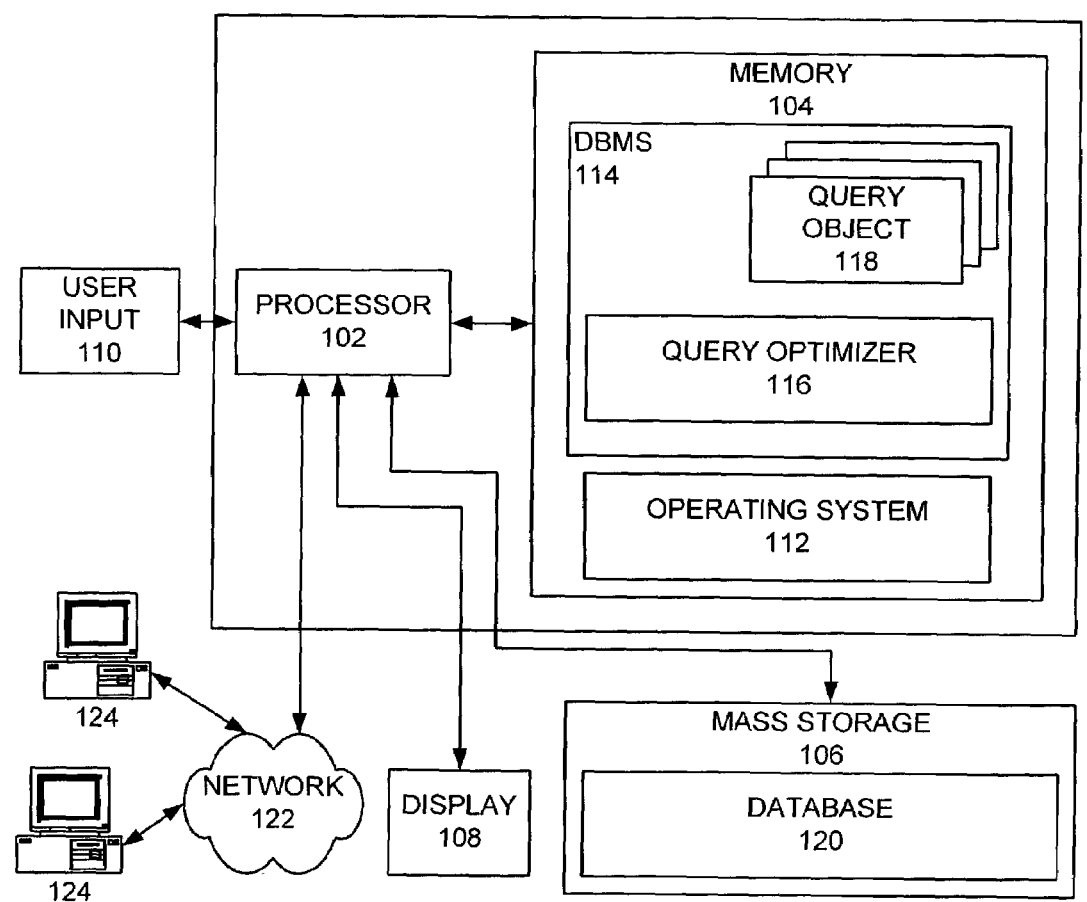
FIG. 1 is a block diagram illustrating a computer system for implementing methods for processing and optimizing database queries in accordance with the preferred embodiment.

Referring now to the drawings, in FIG. 1 there is shown a computer system generally designated by the reference character 100 for implementing live switchover to a temporary sparse index for faster query performance in accordance with the preferred embodiment. Computer system 100 includes a processor 102 coupled to a memory 104. Computer system 100 includes a mass storage 106, such as a direct access storage device (DASD), a display 108, and a user input 110 coupled to the processor 102.

Computer system includes an operating system 112, a database management system 114 including a query optimizer 116 of the preferred embodiment, and a query object 118, and a database 120 stored in the mass storage 106. The query object 118 includes a number of methods or plans capable of performing specific operations relevant to management of the query object and the execution of a query represented by such an object. A local area network (LAN) or wide area network (WAN) 122 couples I/O devices 124, such as personal computers to the computer system 100. Computer system is shown in simplified form sufficient for an understanding of the present invention.

In accordance with features of the invention, when it is not clear whether using an existing index or creating a temporary index will provide the greatest query efficiency, the query optimizer 116 starts running the query using an existing index, while in the background and in parallel, simultaneously building a temporary sparse index for the query. The temporary index built is a sparse index, where the selection of the query is built into the temporary sparse index, such that this index is smaller and more efficient than an existing index that is not query specific. If the query finishes before the temporary sparse index is built, the temporary sparse index build will be terminated. However, when the temporary sparse index is built before the query finishes, a live switchover to the temporary sparse index will be done and the query will continue at the point it left off at using the existing index. Other query choices, such as join order, would be held constant between two plans that use the existing index and the temporary sparse index (in this embodiment).

It should be understood that the present invention is not limited for use with the illustrated computer system 100. The illustrated processor system 100 is not intended to imply architectural or functional limitations. The present invention can be used with various hardware implementations and systems and various other internal hardware devices, for example, multiple main processors.

Various commercially available processors could be used for computer system 100, for example, an iSeries computer system manufactured and sold by International Business Machines Corporation.

Figure 2:
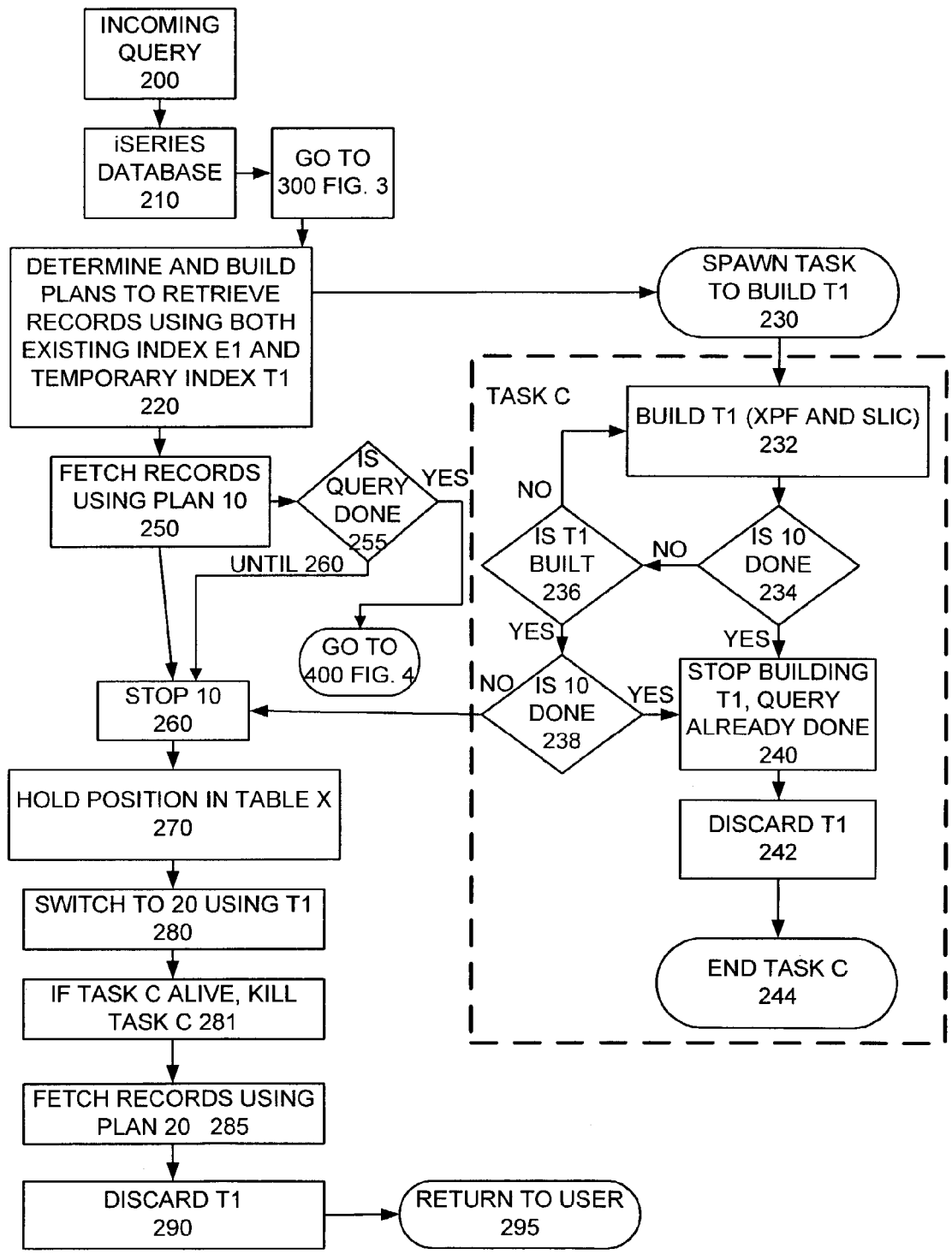
FIGS. 2, 3, and 4 are flow charts illustrating exemplary steps performed by the computer system of FIG. 1 for implementing methods for processing and optimizing database queries in accordance with the preferred embodiment.
Figure 3:
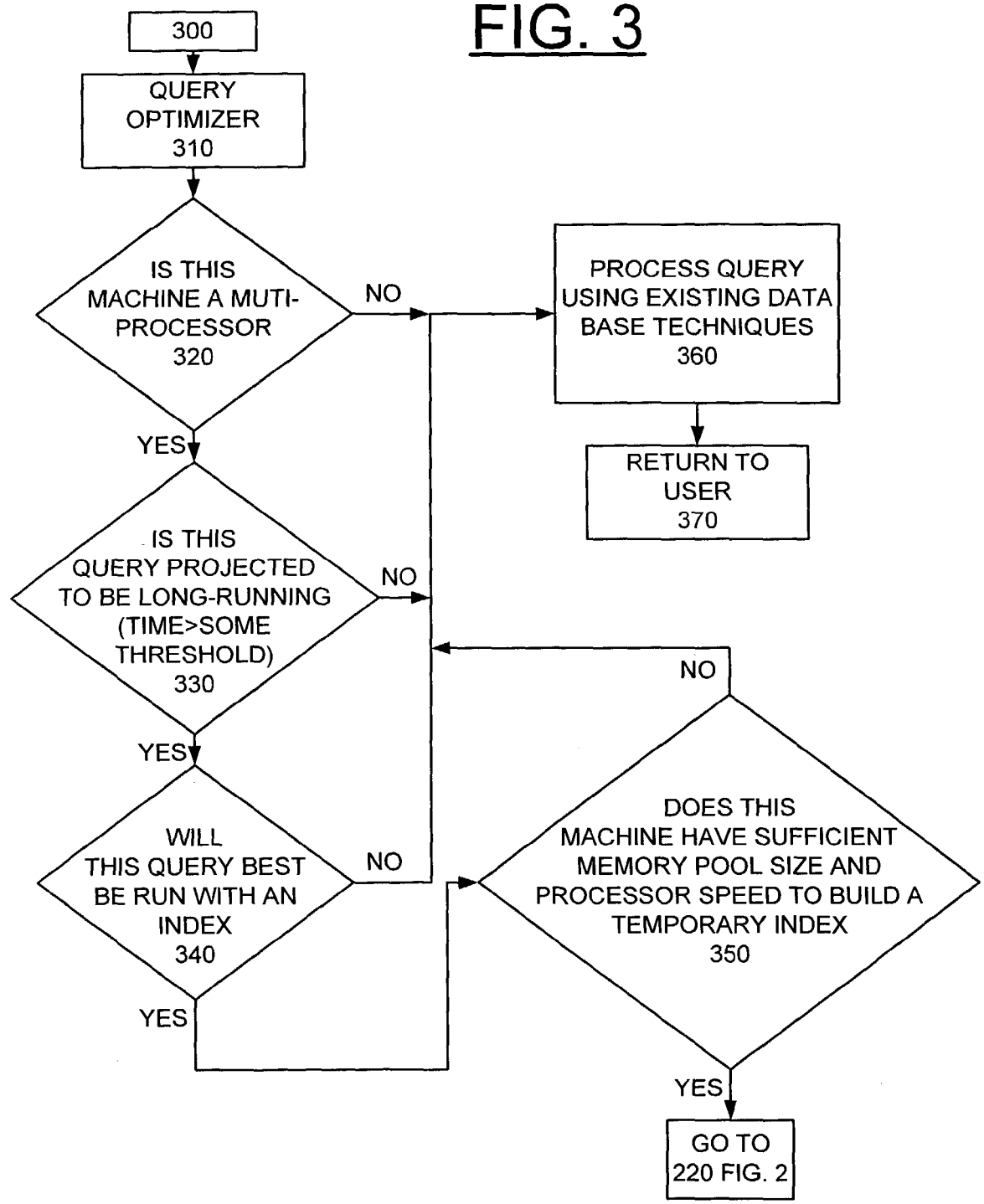
Figure 4:
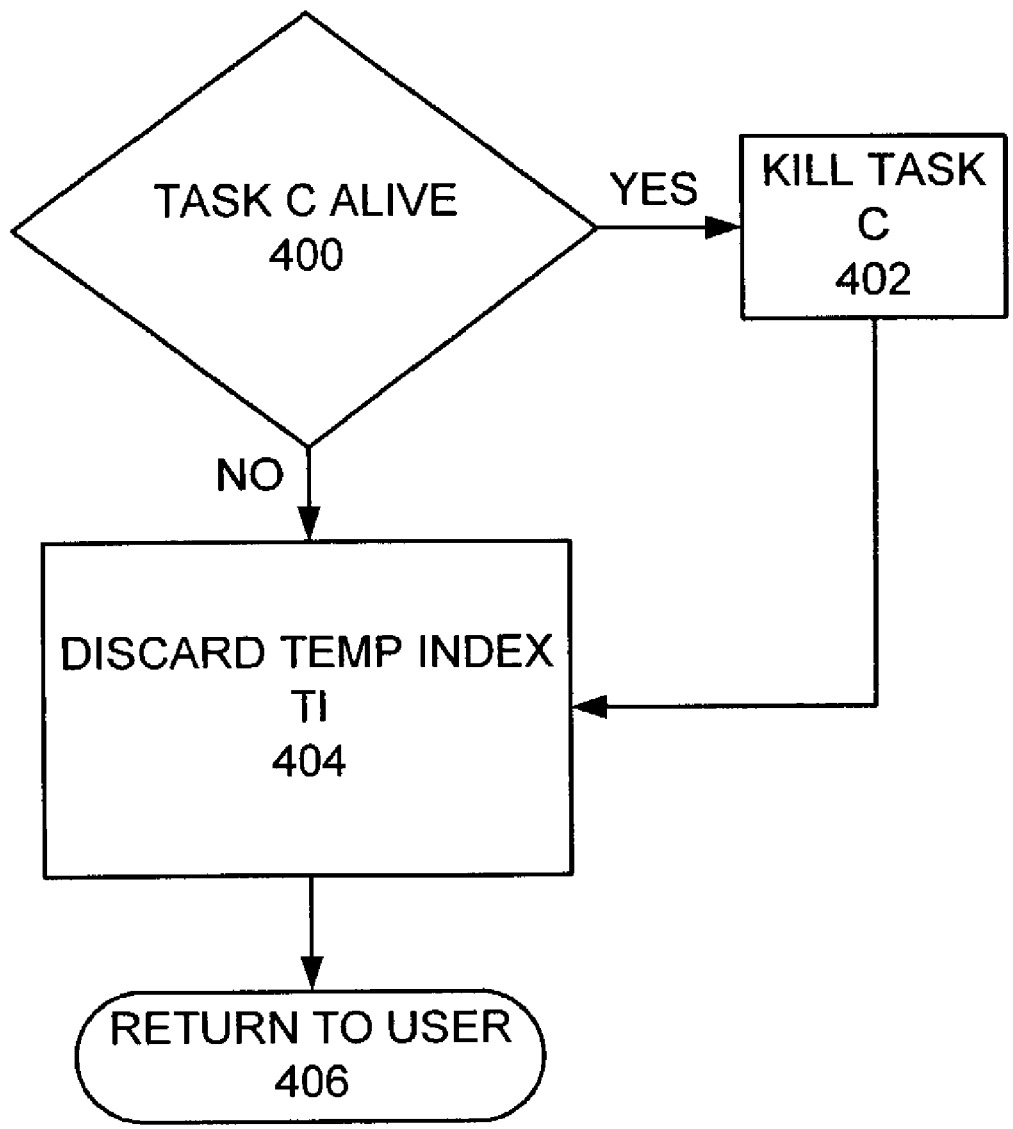

Referring to FIGS. 2, 3, and 4 there are shown exemplary steps performed by the computer system 100 for implementing methods for processing and optimizing database queries in accordance with the preferred embodiment. The query optimizer 116 of the preferred embodiment performs the exemplary steps for processing and optimizing database queries in accordance with the preferred embodiment.

Referring first to FIG. 2, an incoming query is received as indicated in a block 200 and a database is identified, such as an iSeries database for the AS/400, as indicated in a block 210. Then the exemplary steps go to FIG. 3, starting at a block 300, before running the dual access paths concurrently as shown in FIG. 2. The query optimizer 116 as indicated in a block 310 determines that the system has the horsepower or the system meets the requirements for implementing the methods of the preferred embodiment.

Referring to FIG. 3, the query optimizer 116 determines that the system is a multiprocessor as indicated in a decision block 320, so that parallel processors can work on the access methods concurrently. The query optimizer 116 determines that the query is projected to be long-running, that is the projected time is greater than some threshold, as indicated in a decision block 330. Next the query optimizer 116 determines that the query is best run with an index as indicated in a decision block 340. Then the query optimizer 116 determines that there is enough memory pool size to accommodate both methods without causing memory thrashing; and that other processor resources are sufficient, such as CPU utilization, processor speed, and so on as indicated in a decision block 350. Then the sequential steps return to block 220 in FIG. 2. Otherwise, if the machine is not a multiprocessor, or the query is not projected to be long-running, or the query is not best run with an index, or that the there is not enough memory pool size or that other processor resources are not sufficient, then the query is processed using existing data base techniques as indicated in a block 360. The query results are returned to the user to complete the sequential steps as indicated in a block 370.

Referring to FIG. 2, as indicated in a block 220, the query optimizer 116 determines and builds plans to retrieve records using both an existing index E1 and a temporary sparse index T1. The query optimizer 116 of the preferred embodiment provides a function or task as indicated in a block 230 to proceed with creating a temporary sparse index T1, while at the same time building plans to access the data using the existing index and using a temporary sparse index at block 220.

After the plans are built at block 220, then records responsive to the query are fetched using a first plan or plan 10 using the existing index as indicated in a block 250. Checking whether the query is done or until the plan 10 is stopped at block 260 is performed as indicated in a decision block 255. Simultaneously, the temporary sparse index T1 is being built, for example, on an iSeries database for the AS/400, the temporary sparse index T1 is built using Extended Program Facility (XPF) and System Licensed Internal Code (SLIC) code as indicated in a block 232. If the query completes before the temporary sparse index is built as determined at decision block 255, then the exemplary steps continue at block 400 in FIG. 4.

Referring to FIG. 4, checking whether task C is alive as indicated in a decision block 400 is performed. If task C is alive, the task C is killed as indicated in a block 402. The partially built temporary sparse index is discarded as indicated in a block 404 and control is returned to the user as indicated in a block 406.

While building the temporary sparse index T1, periodical checking is performed to determine whether the query is already done as indicated in a decision block 234. Then checking whether the temporary sparse index T1 is complete is provided as indicated in a decision block 236. If the temporary sparse index T1 is not built yet, then building the temporary sparse index T1 continues at block 232.

At the point the temporary sparse index is built as identified at decision block 236, then checking whether the query is done as indicated in a decision block 238. If the query is done as determined at decision block 238, or if the query finishes before the temporary sparse index is built as determined at decision block 234, then the creation of the temporary sparse index is ended as indicated in a block 240. The partially built temporary sparse index is discarded as indicated in a block 242 and the task C ends as indicated in a block 244.

Otherwise at the point the temporary sparse index is built as identified at decision block 236 and before the query completes as identified at decision block 238, then the live switchover to the temporary sparse index is provided. Fetching records using plan 10 is stopped as indicated in a block 260. After the live switchover, the query will continue at the exact same point; that is, the same relative record number, the query left off with plan 10 using the existing index when stopped at block 260. The position in the table X is held as indicated in a block 270. For example, the live switchover could occur when a table in the left most position of a join query, or the only file in a single file query, that spins to the next record to start processing using the temporary sparse index T1, such as illustrated and described with respect to FIG. 5. Then the records responsive to the query are fetched using a second plan or plan 20 using the temporary sparse index T1 starting at the held position as indicated in a block 280. If task C is alive, this task is killed as indicated in a block 281. The query continues running until all relevant records are fetched using plan 20 at block 285. Then the temporary sparse index T1 is discarded as indicated in a block 290 and control is returned to the user as indicated in a block 295.

Figure 5:
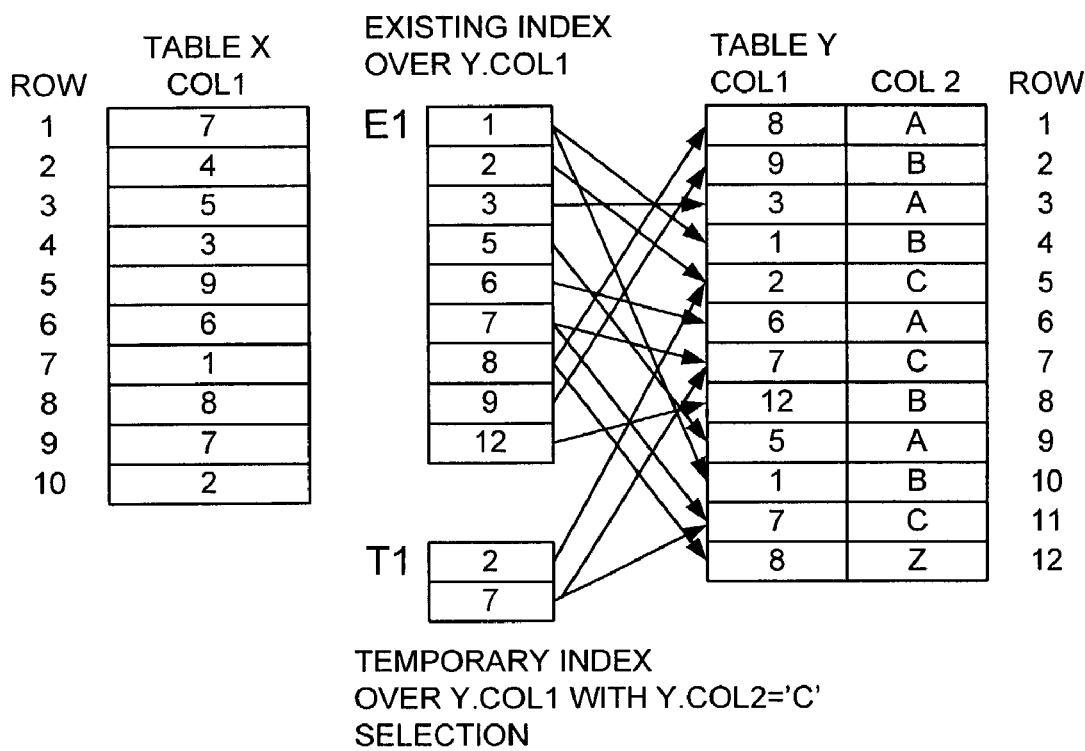
FIG. 5 is a diagram illustrating an exemplary implementation of a query utilizing an existing index and a temporary sparse index in accordance with the preferred embodiment.

Referring to FIG. 5, there is shown an exemplary implementation of a query utilizing an existing index and a temporary sparse index in accordance with the preferred embodiment. For example, the query is:

Select * from X inner join Y on (X.COL1=Y.COL1)
    where (Y.COL2='C')

A high level pseudo code of live switchover using nested loop join algorithm for the above queue is provided in Table 1 with references to FIGS. 2 and 4 as follows:

FIG. 5 illustrates an example of plan 10 and switchover to plan 20 and Table X COL1 with an existing index E1 over Y.COL1 and a Temporary sparse index T1 over Y.COL1 with Y.COL2='C' selection. The query Select * from X inner join Y on (X.COL1=Y.COL1) where (Y.COL2='C') will find rows (records) in table Y for which the value COL1 of Table X is equal to COL1 in Table Y and also COL2 of Table Y='C', and for each such case returns the row (record) in Table X.

For plan 10, the selection starts at position 1 (row 1) in Table X or (COL1=7). Searching index E1 for 7 using a binary search finds 7 in E1 with pointers to rows 7 and 11 in Table Y. Using the pointers to rows 7 and 11 to Table Y, and then checking COL2 in both cases shows 'C' in table Y (rows 7 and 11). Therefore, row 1 in Table X is returned to the user twice, once for row 7 in Table Y and once for row 11 in Table Y. Next going to position 2 in Table X (COL1=4), searching index E1 for 4 using a binary search does not find 4. Then going to position 3 in Table X (COL1=5), searching index E1 for 5 using a binary search finds 5 in E1 with a pointer to row 9 in Table Y. Using the pointer to row 9 in Table Y, see that COL2 is not equal 'C', so a row is not returned in Table X to the user. Plan 10 continues in this manner until the end of all rows in Table X, or until there is a live switchover to index T1.

Assume that temporary sparse index T1 is built after processing Table X to position 7, and then there is a live switchover to plan 20 using the index T1. At position 8 in Table X (COL1=8), instead of searching index E1, the

TABLE 1

| | |
|---|---|
| Wait for incoming query | block 200 |
| Build plans for incoming query | |
|     plan 1) Table scan of X and index E1 for Y | |
|     plan 2) Table scan of X and index T1 for Y | block 220 |
| Spawn Task C and build T1 for Y | block 230, 232 |
| /*begin nested loop join*/ | |
| For each record in X | |
|     If (T1 finished building) | block 238, 260 |
|     Then | |
|     Do plan 20 for 1 record | |
|         If Task C still alive | |
|             Then kill task C | block 281 |
|         Probe T1 over Y.COL1 with the join value of X.COL1 | |
|         If (Match in T1) | |
|         Then | |
|             1) follow the pointer to the table Y | |
|             2: apply any other Y selection (in this case no remaining Y selection) | |
|                 If (Y selection Matches) | |
|                 Then return record to user | |
|                 Else discard record | |
|         Else discard record | block 285 (plan 20) |
|     End plan 20 for 1 record | |
|     Else/*use existing index*/ | |
|     Do plan 10 for 1 record | |
|         Probe E1 over Y.COL1 with the join value of X.COL1 | |
|         If (Match in E1) | |
|         Then | |
|             1) follow the pointer to the table Y | |
|             2: apply any other Y selection (in this case Y.COL2='C') | |
|                 If (Y selection Matches) | |
|                 Then return record to user | |
|                 Else discard record | |
|         Else discard record | block 250 (plan 10) |
|     End plan 10 for 1 record | |
| END /* for each record in X*/ | |
| /*cleanup*/ | |
| If Task C still alive | block 400 |
| Then Kill Task C | block 402 |
| Discard temporary sparse index T1 | block 404 |
| Return to User | block 406 | temporary sparse index T1 which is smaller and much faster is searched using a binary search. There is no 8 in the temporary sparse index T1, so go to position 9 in Table X or (COL1=7), searching in T1 for 7 finds 7 in T1 with pointers to rows 7 and 11 in Table Y. Note that testing COL2 in rows 7 and 11 for 'C' is not required because the sparse index T1 already guarantees that all its pointers only point to rows in Table Y where COL2='C'.

Having reference to FIG. 5, it can be understood that using the live switchover to index T1 by the query optimizer 116 provides a much faster fetch time because every record processed in the temporary sparse index T1 is a record of interest, and no time is wasted going to Table Y for records that are discarded immediately as often occurs when using the existing index E1.

Figure 6:
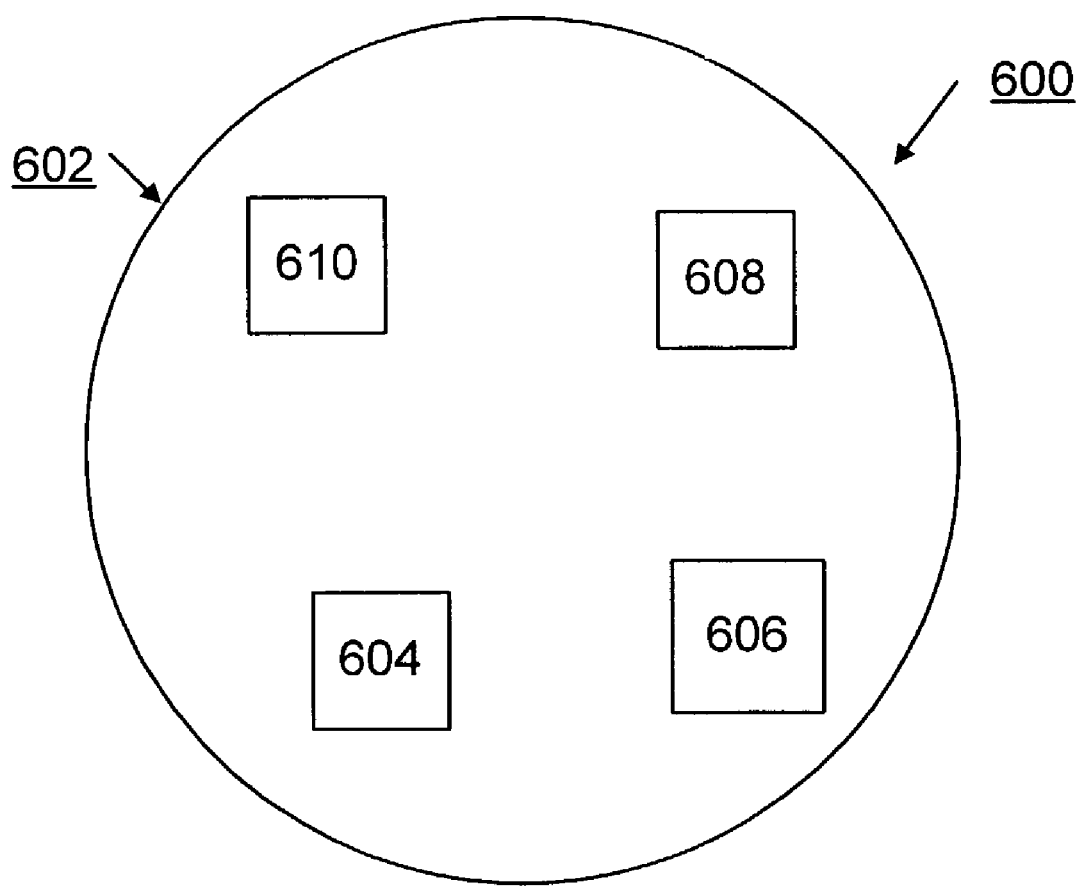
FIG. 6 is a block diagram illustrating a computer program product in accordance with the preferred embodiment.

Referring now to FIG. 6, an article of manufacture or a computer program product 600 of the invention is illustrated. The computer program product 600 includes a recording medium 602, such as, a floppy disk, a high capacity read only memory in the form of an optically read compact disk or CD-ROM, a tape, a transmission type media such as a digital or analog communications link, or a similar computer program product. Recording medium 602 stores program means 604, 606, 608, 610 on the medium 602 for carrying out the methods for implementing live switchover to a temporary sparse index for faster query performance of the preferred embodiment in the system 100 of FIG. 1.

A sequence of program instructions or a logical assembly of one or more interrelated modules defined by the recorded program means 604, 606, 608, 610, direct the computer system 100 for implementing live switchover to a temporary sparse index for faster query performance of the preferred embodiment.

While the present invention has been described with reference to the details of the embodiments of the invention shown in the drawing, these details are not intended to limit the scope of the invention as claimed in the appended claims.

What is claimed is:

1. A method for implementing live switchover to a temporary sparse index for faster query performance comprising the steps of:
   using a first plan with an existing index for processing a query;
   building a temporary sparse index for the query simultaneously and in parallel with the first plan processing the query; the temporary sparse index being smaller than the existing index, the temporary sparse index having a selection of the query being built into the temporary sparse index;
   responsive to identifying the temporary sparse index as being built, stopping the processing of the query with the first plan and providing a live switchover to the temporary sparse index; and
   using a second plan with the temporary sparse index to continue processing the query at a point where processing of the query stopped with the first plan.

2. A method for implementing live switchover to a temporary sparse index as recited in claim 1 wherein the step of simultaneously building the temporary sparse index for the query includes the steps of periodically checking for processing the query with the first plan being completed.

3. A method for implementing live switchover to a temporary sparse index as recited in claim 1 includes the steps, responsive to the first plan processing the query being completed before identifying the temporary sparse index as being built, of ending the temporary sparse index building step and discarding a partially built temporary sparse index.

4. A method for implementing live switchover to a temporary sparse index as recited in claim 3 further includes the steps of returning results of the query to the user.

5. A method for implementing live switchover to a temporary sparse index as recited in claim 1 includes initial steps of receiving a query and determining that system memory and processor resources are available for building the temporary sparse index for the query.

6. A method for implementing live switchover to a temporary sparse index as recited in claim 5 further includes building the first plan and the second plan for processing the query.

7. A method for implementing live switchover to a temporary sparse index as recited in claim 1 wherein the steps of stopping the processing of the query with the first plan and providing a live switchover to the temporary sparse index includes the step of holding a current position in the processing of the query with the first plan.

8. A method for implementing live switchover to a temporary sparse index as recited in claim 7 wherein the step of using the second plan with the temporary sparse index to continue processing the query at a point where processing of the query stopped with the first plan includes the step of using the second plan with the temporary sparse index to continue processing the query at said current position.

9. A query optimizer for implementing enhanced query performance comprising:
   a first plan using an existing index processing a query;
   a task building a temporary sparse index for the query simultaneously and in parallel with said first plan processing the query; the temporary sparse index being smaller than the existing index, the temporary sparse index having a selection of the query being built into the temporary sparse index;
   said task being responsive to identifying the temporary sparse index as being built, stopping processing the query with said first plan and providing a live switchover to the temporary sparse index; and
   a second plan using the temporary sparse index to continue processing the query at a point where processing of the query stopped with the first plan.

10. A query optimizer for implementing enhanced query performance as recited in claim 9 wherein said task is responsive to processing the query being completed by the first plan before the temporary sparse index is identified as being built, for discarding a partially built temporary sparse index and ending said task.

11. A query optimizer for implementing enhanced query performance as recited in claim 9 wherein said task checks for processing the query being completed by the first plan and continues building the temporary sparse index for the query responsive to processing the query not being completed by the first plan.

12. A computer program product for implementing enhanced query performance in a computer system, said computer program product including a plurality of computer executable instructions stored on computer readable storage medium, said instructions when executed by the computer system to cause the computer system to perform the steps of:
   using a first plan with an existing index for processing a query;
   building a temporary sparse index for the query simultaneously and in parallel with said first plan processing the query; the temporary sparse index being smaller than the existing index, the temporary sparse index having a selection of the query being built into the temporary sparse index;

responsive to identifying the temporary sparse index as being built, stopping the processing of the query with the first plan and providing a live switchover to the temporary sparse index; and using a second plan with the temporary sparse index to continue processing the query at a point where processing of the query stopped with the first plan.

13. A computer program product for implementing enhanced query performance in a computer system as recited in claim 12 wherein said instructions further cause the computer system to perform the steps of periodically checking for the query processing being completed.

14. A computer program product for implementing enhanced query performance in a computer system as recited in claim 13 wherein said instructions further cause the computer system to perform the steps of ending the temporary sparse index building step and discarding a partially built temporary sparse index responsive to processing the query being completed by the first plan before identifying the temporary sparse index as being built.

15. A computer program product for implementing enhanced query performance in a computer system as recited in claim 14 wherein said instructions further cause the computer system to perform the steps of returning results of the query to the user.

16. A computer program product for implementing enhanced query performance in a computer system as recited in claim 12 wherein said instructions further cause the computer system to perform the steps of returning results of the query to the user responsive to the query processing being completed by the second plan and discarding the temporary sparse index.

* * * * *